US012421099B2

(12) United States Patent
Kumra

(10) Patent No.: US 12,421,099 B2
(45) Date of Patent: Sep. 23, 2025

(54) PRESSURISED OXYGEN-FREE CLOSED-LOOP BEVERAGE TRANSFER DEVICE

(71) Applicant: Aman Kumra, Greater London (GB)

(72) Inventor: Aman Kumra, Greater London (GB)

(73) Assignee: Aman Kumra, London (GB)

( * ) Notice: Subject to any disclaimer, the term of this patent is extended or adjusted under 35 U.S.C. 154(b) by 0 days.

(21) Appl. No.: 18/246,330

(22) PCT Filed: Sep. 29, 2021

(86) PCT No.: PCT/GB2021/052526

§ 371 (c)(1),
(2) Date: Mar. 22, 2023

(87) PCT Pub. No.: WO2022/069886

PCT Pub. Date: Apr. 7, 2022

(65) Prior Publication Data

US 2023/0391606 A1 Dec. 7, 2023

(30) Foreign Application Priority Data

Sep. 30, 2020 (GB) ...................................... 2015524

(51) Int. Cl.
*B65D 83/00* (2006.01)
*B67D 7/02* (2010.01)
*B67D 7/36* (2010.01)
*B67D 7/58* (2010.01)

(52) U.S. Cl.
CPC ......... *B67D 7/0244* (2013.01); *B67D 7/0294* (2013.01); *B67D 7/36* (2013.01); *B67D 7/58* (2013.01)

(58) Field of Classification Search
CPC ...... B67D 7/0244; B67D 7/0294; B67D 7/36; B67D 7/58
See application file for complete search history.

(56) References Cited

U.S. PATENT DOCUMENTS

| | | | | | |
|---|---|---|---|---|---|
| 5,887,752 | A * | 3/1999 | Strother | ............... | B67D 7/0227 222/386 |
| 7,533,701 | B2 | 5/2009 | Gadzic | | |
| 8,272,538 | B2 | 9/2012 | Miller | | |
| 2008/0272154 | A1 * | 11/2008 | Maas | .................. | B67D 7/0255 222/386.5 |
| 2017/0137275 | A1 | 5/2017 | Lambrecht | | |
| 2017/0313567 | A1 * | 11/2017 | Rasmussen | ............... | B67C 7/00 |

* cited by examiner

*Primary Examiner* — Paul J Gray

(57) ABSTRACT

An apparatus for transferring a beverage from a sealed container into a storage vessel includes a needle for insertion through a stopper of the sealed container having a conduit for the flow of beverage through the needle and a pressurisation mechanism configured to pressurise the sealed container to displace the beverage through the needle and into the receiving vessel in use. The apparatus is configured so that, when the needle is inserted into the sealed container and connected to the storage vessel, the sealed container, needle and storage vessel form a closed system, allowing the beverage to be transferred from the sealed container into the storage vessel without air outside of the closed system mixing with the beverage.

18 Claims, 12 Drawing Sheets

PRESSURISED OXYGEN-FREE CLOSED-LOOP BEVERAGE TRANSFER DEVICE

CROSS REFERENCE TO RELATED APPLICATIONS

The present application is a § 371 National Stage of International Application PCT/GB2021/052526, filed Sep. 29, 2021, which claims priority benefit of British Pat. Application GB2015524.8, filed Sep. 30, 2020.

FIELD OF THE INVENTION

The invention relates to a beverage transfer device and a method of transferring a beverage.

BACKGROUND OF THE INVENTION

Some alcoholic beverages age after bottling, allowing certain flavour characteristics to develop. Wines in particular can be stored to allow air inside the bottle to react with and age the wine over time. Wine stored in corked bottles also age due to the cork being permeable allowing the slow ingress of air into the bottle. This ageing process has to be tightly controlled to prevent over oxidation of the wine with the associated adverse ageing effects, such as discolouration and the acquisition of unwanted aromas. Wines therefore have a limited shelf life and an optimum window in which to be consumed.

Once a bottle has been opened, the exposure of the wine to fresh air causes new oxidation that further alters the characteristics of the wine. Over exposure to air following opening can cause the wine to lose the aromas and flavours, which give the wine its preferential character.

SUMMARY OF THE INVENTION

The present invention provides a device or apparatus for transferring a beverage from a sealed container into a storage vessel, a method of transferring a beverage from a sealed container into a storage vessel, and a method of operating the device or apparatus for transferring a beverage from a sealed container into a storage vessel.

According to the invention there is provided an apparatus for transferring a beverage from a sealed container into a storage vessel, the apparatus comprising:

- a needle for insertion through a stopper of the sealed container having a conduit for the flow of beverage through the needle; and
- a pressurisation mechanism configured to pressurise the sealed container to displace the beverage through the needle and into the storage vessel in use;
- wherein the apparatus is configured so that, when the needle is inserted into the sealed container and connected to the storage vessel, the sealed container, needle and storage vessel form a closed system, allowing the beverage to be transferred from the sealed container into the storage vessel without air outside of the closed system mixing with the beverage.

The needle may comprise a pin displaceable along the length of the conduit between an inlet for the beverage and a first opening for connection to the storage vessel.

The pin may comprise a seal disposed between the pin and the conduit.

A connector may be provided at the opening, the connector being configured to form a sealed connection with the storage vessel.

The needle may further comprise a second opening for connection to a sample vessel, the second opening being disposed between the inlet and the first opening.

The inlet may be an aperture in a longitudinal wall of the needle.

The apparatus may comprise a vacuum pump operable to remove any residual air from the closed system, i.e., the closed system of the present disclosure is entirely purged of air.

The pressurisation mechanism may comprise an inflatable bladder for displacing the beverage.

The pressurisation mechanism may comprise a pump configured to inflate the bladder.

The needle may comprise a cavity between a wall of the conduit and an outer wall of the needle to house the bladder, and an aperture in the outer wall from which the bladder can expand to displace the beverage.

The pressurisation mechanism may comprise a second needle having an internal cavity to house the bladder and an aperture from which the bladder can expand to displace the beverage.

The aperture may be in a longitudinal wall of the second needle.

The aperture may be configured to allow inflation of the bladder radially about the second needle so that the bladder expands outward and into contact with sides of the sealed container on inflation.

The aperture may be configured to allow inflation of the bladder radially about the needle so that the bladder expands outward and into contact with sides of the sealed container on inflation.

The pressurisation mechanism may comprise a reservoir of inert gas.

The pressurisation mechanism may be configured to introduce inert gas into the sealed container through the needle.

The pressurisation mechanism may comprise a second needle configured to introduce inert gas into the sealed container.

The apparatus may further comprise a storage vessel for connection to the outlet.

The storage vessel may comprise a flexible bag which is vacuum sealed prior to use.

Also, according to the invention there is provided apparatus for transferring a beverage from a sealed container into a storage vessel, the apparatus comprising:

- a first needle for insertion through a stopper of the sealed container having a conduit for the flow of beverage through the first needle;
- a transfer pipe to fluidly connect the first needle to the storage vessel so that, in use, the sealed container, first needle, transfer pipe and storage vessel form part of a closed system, allowing the beverage to be transferred from the sealed container into the storage vessel without air outside of the closed system mixing with the beverage; the apparatus further comprising:
- a pressurisation mechanism configured to pressurise the sealed container to displace the beverage through the needle and into the storage vessel in use, the pressurisation mechanism comprising a reservoir of inert gas and a second needle for insertion through the stopper of the sealed container to introduce inert gas and pressurise the sealed container.

The apparatus may further comprise a vacuum pump operable to remove any residual air from the closed system, i.e., the closed system of the present disclosure is entirely purged of air.

The apparatus may further comprise a bypass pipe to fluidly connect the transfer pipe to the reservoir, and first and second three-way control valves, the first three-way control valve connecting the first needle to the transfer pipe and the bypass pipe, and the second three-way control valve connecting the second needle to the reservoir of inert gas and the bypass pipe; wherein the first and second three-way control valves are configurable in a first position to connect the reservoir of inert gas to the transfer pipe via the bypass pipe to flush through the closed system with insert gas; and wherein the first and second three-way control valves are configurable in a second position to connect the second needle to the reservoir of inert gas and to connect the transfer pipe to the first needle to allow pressurisation of the sealed container and the displacement of beverage along the transfer pipe.

The vacuum pump may be fluidly connected to the storage vessels so that, when the first and second control valves are in the first position, operation of the vacuum pump draws inert gas into the storage vessels. In other words, any residual air present in the storage vessels is displaced by the inert gas.

The storage vessel may comprise a bottle and self-sealing stopper.

The apparatus may further comprise a pin for removal of air from the storage vessel, the pin being fluidly connected to the vacuum pump and insertable through the self-sealing stopper.

The first needle may be provided in fluid communication with a filling pin for insertion through the self-sealing stopper.

Also, according to the invention there is provided a method of transferring a beverage from a sealed container into a storage vessel comprising:

inserting a needle through a stopper of the sealed container and making a sealed connection between the needle and the storage vessel so that the sealed container, needle and storage vessel form a closed system preventing air outside of the closed system mixing with the beverage;

operating a pressurisation mechanism to transfer the beverage from the sealed container into the storage vessel.

Also, according to the invention, there is provided a method of operating the apparatus.

The method includes:

setting the first and second control valves in the first position;

operating the vacuum pump to draw inert gas through the bypass valve, transfer pipe and storage vessel; and setting the first and second control valves in the second position to pressurise the sealed container and displace the beverage in the storage vessel.

These and other objects, advantages and features of the invention will become apparent upon review of the following specification in conjunction with the drawings.

BRIEF DESCRIPTION OF THE DRAWINGS

Embodiments of the invention will now be described, by way of example only, with reference to accompanying drawings, in which.

DESCRIPTION OF THE PREFERRED EMBODIMENTS

The present invention provides apparatus for transferring a beverage from a sealed bottle to a storage vessel. The apparatus is designed as a closed system to prevent the beverage mixing with air from outside the bottle during the transfer process. The storage vessel, once filled is sealed and airtight. This invention finds particular application with beverages—such as wine—stored in bottles having a permeable cork/synthetic cork stopper which allow the beverage to age continuously due to the slow ingress of air permeating through the stopper. It is intended that, when a beverage has reached its optimum condition in the ageing process, the apparatus may be operated to transfer the beverage into the storage vessel and thereby allow the long-term storage of the beverage at its optimum condition, without any degradation in condition due to continued ageing. The present invention also allows the beverage to be transferred to multiple storage vessels to allow individual portions to be consumed at different times. This is to be compared with opening a bottle and consuming the beverage from the bottle over a period of time, in which time the beverage will have degraded.

Figure 1:
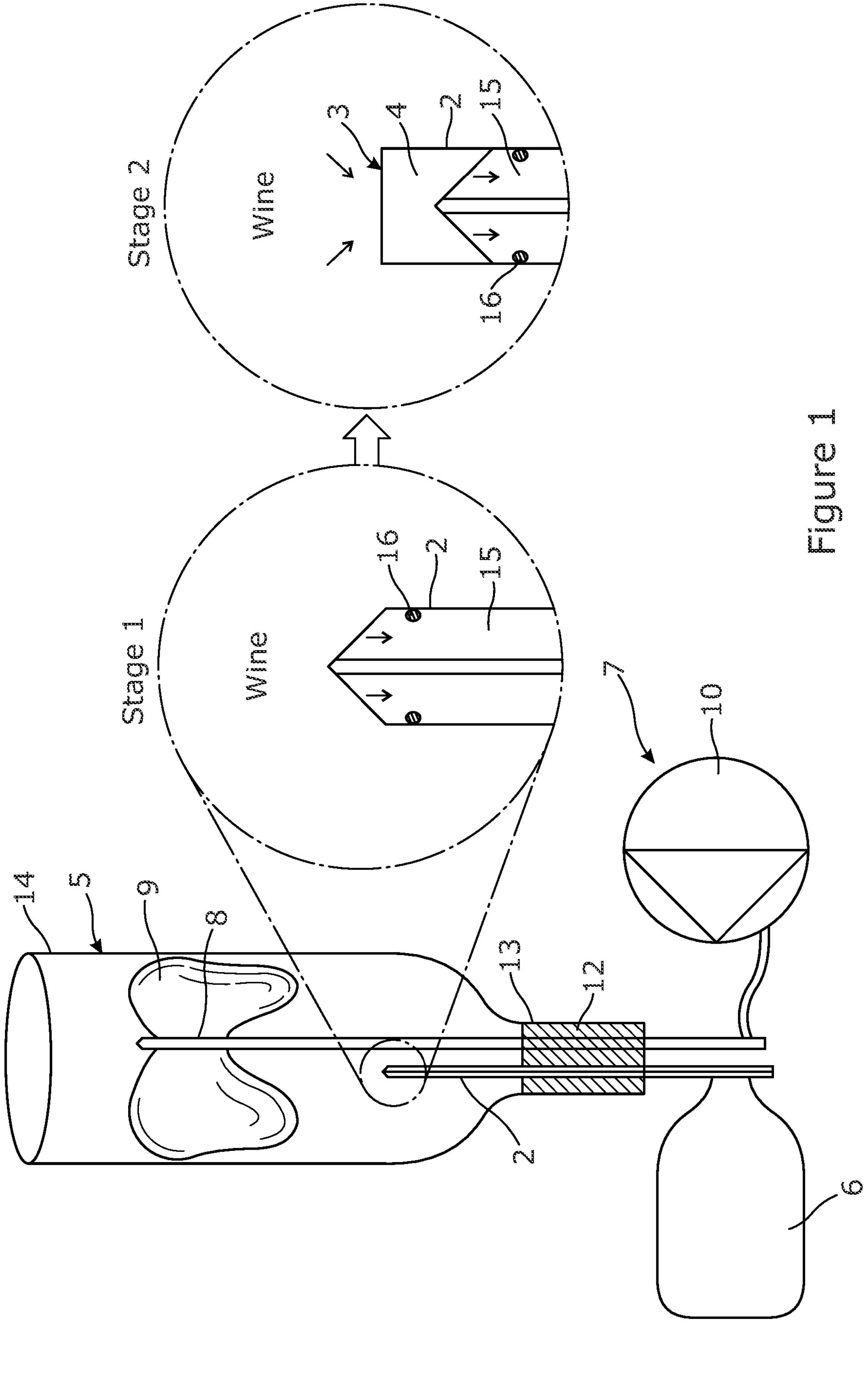
FIG. 1 shows an apparatus for transferring a beverage to a storage vessel according to embodiments of the invention.
Figure 2:
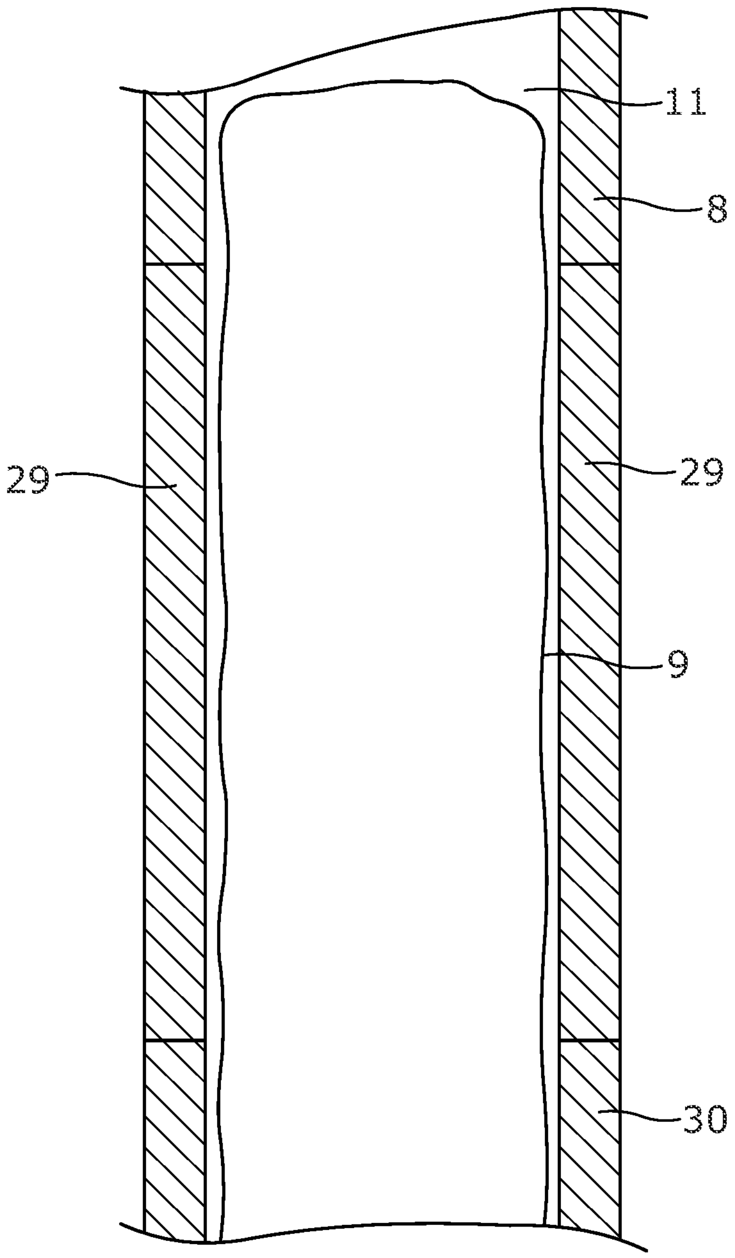
FIG. 2 is a detail view of a second needle according to embodiments of the invention.

FIG. 1 illustrates apparatus 1 according to a first embodiment of the invention. The apparatus 1 comprises a first needle 2 configured for insertion through a stopper 12 of a sealed beverage container 5. The first needle 2 comprises an inlet 3 and a conduit 4 to allow the beverage to flow out of the container 5 along the conduit 4 and into a storage vessel 6. The apparatus 1 also comprises a pressurisation mechanism 7 configured to pressurise the sealed container 5 to displace the beverage through the needle 2. The pressurisation mechanism 7 comprises a second needle 8, an inflatable bladder 9 and a pump 10 for inflating the bladder 9. Prior to inflation, the bladder 9 is housed in a cavity 11 in the second needle 8 as shown in FIG. 2. Therefore, the bladder 9 may be introduced into the container 5 by insertion of the second needle 8 through the stopper 12. When the bladder 10 is inflated, it expands from within the cavity 11 and out of an aperture 29 in the second needle 8.

In some embodiments, the aperture 29 is provided in a longitudinal wall 30 of the second needle 8. The aperture 29 is configured to allow inflation of the bladder 9 radially about the second needle 8 so that the bladder 9 expands outward and into contact with sides of the bottle 5 on inflation. The aperture 29 may comprise multiple apertures 29 arranged about the circumference and/or along the length of the second needle 8. For example, four apertures 29 may be provided spaced 90 degrees apart. Preferably, each aperture 29 may be elongate and extend in a longitudinal direction of the second needle 8.

In some embodiments, the aperture 29 may be provided in the tip of the second needle 8.

In some embodiments, the bladder 9 comprises multiple bladders 9, each bladder 9 being configured to expand from within the cavity 11 out of a respective aperture 29. In such embodiments, the bladders 9 may each comprise a flexible membrane that extends across a respective aperture 29, the pump 10 being configured to pressurise the cavity 11 to cause expansion of the bladders 9 out of the apertures 29.

In some embodiments, the bladders 9 are separately connected to the pump by a corresponding pipe running from the pump 10 and into the cavity 11. Advantageously, this allows each bladder 9 to be separately pressurised, allowing the bladders 9 to be inflated at different times.

The apparatus 1 may further comprise a clamp (not shown) to hold the beverage container 5 in an inverted or angled orientation during use of the apparatus. In the illustrated embodiments, the beverage container 5 comprises a bottle having a neck portion 13 and a wider body portion 14. The clamp may be configured to grip the neck 13 or the body 14 of the bottle 5. It shall be appreciated however that the clamp may be configured to grip a container of any shape or size.

The first needle 2 comprises a pin 15 slideably disposed within the conduit 4, as shown in FIG. 1. A seal 16 is provided between the pin 15 and the conduit 4 so that the pin 15 acts as a piston, controlling the flow of beverage down the conduit 4.

Figure 3:
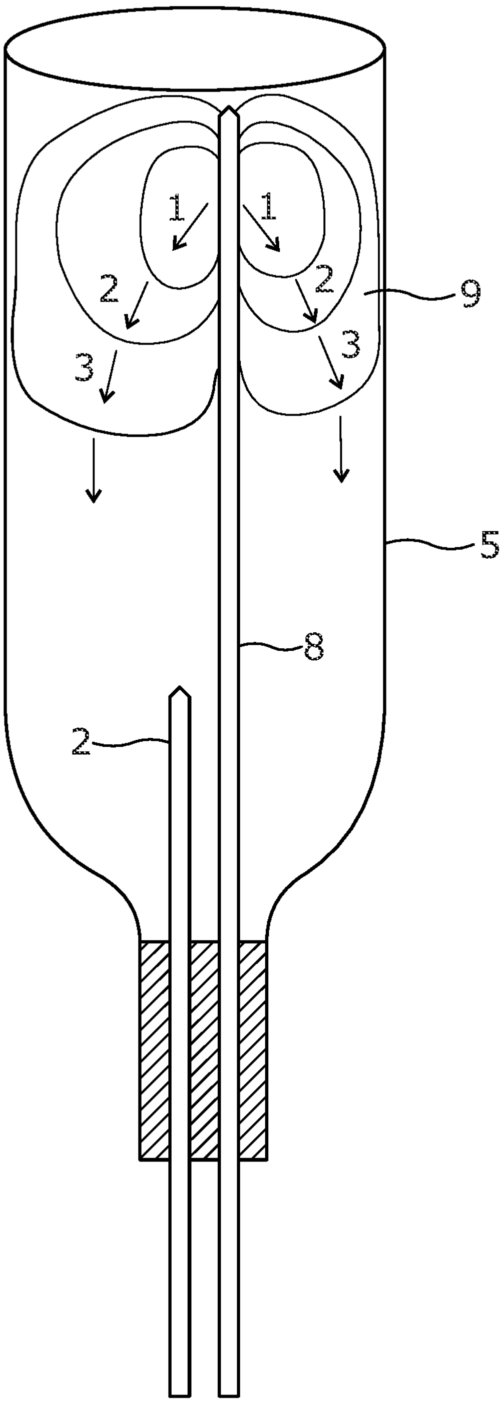
FIG. 3 shows the stages of operation of a pressurisation mechanism of the apparatus.

In use, the bottle 5 is clamped in position. The first and second needles 2, 8 are inserted into the bottle 5 through the stopper 12 and a storage vessel 6 is connected to the first needle 2. To transfer the beverage from the bottle 5 to the storage vessel 6, the pin 15 is drawn down the conduit 4 of the first needle 2 while the bladder 9 simultaneously inflated by the pump 10. The inflation of the bladder 9 and the movement of the pin 15 causes the beverage to be displaced along the conduit 4. FIG. 3 shows the bladder in three stages of inflation. Inflation of the bladder is gradual and prevents a vacuum forming inside the bottle 5 by filling the space left by the beverage as the beverage is transferred to the storage vessel 6. It shall be appreciated that the use of the terms 'first needle 2' and 'second needle 8' are not used to imply a preferred order of insertion of the needles 2, 8, but are used merely to distinguish between them. In fact, in the first embodiment, it may be beneficial to insert the second needle 8 first to partially inflate the bladder 9 and pressurise the bottle 5, before insertion of the first needle 2.

Figure 4B:
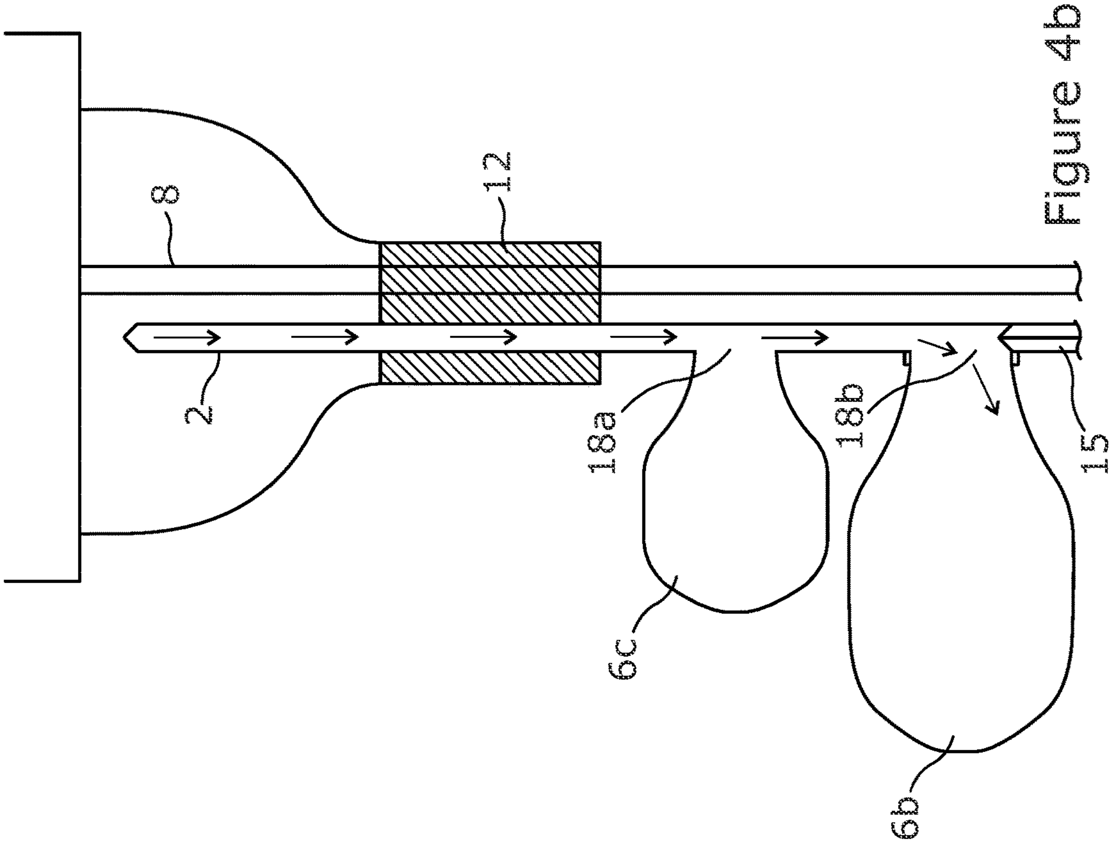
FIGS. 4*a* and 4*b* show the stages of operation of a first needle of apparatus according to embodiments of the invention.
Figure 4A:
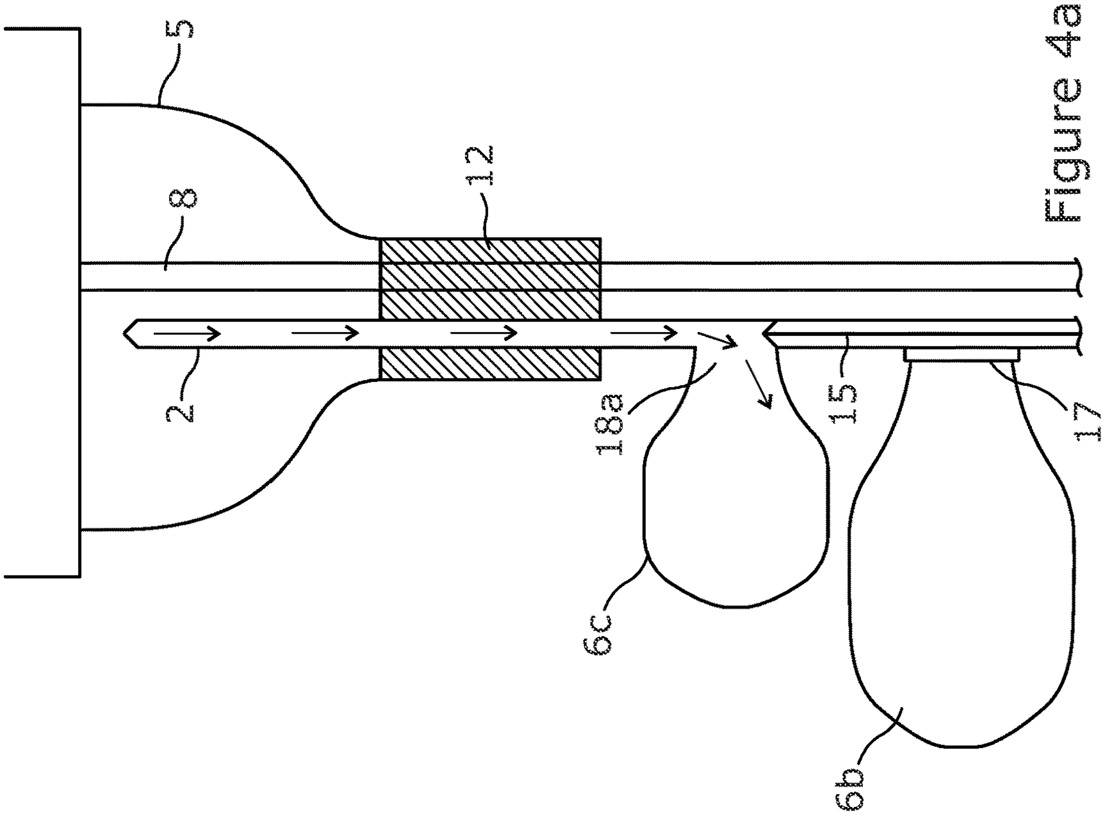

FIGS. 4*a* and 4*b* show the first needle 2 connected to two storage vessels 6*a*, 6*b*. Although two storage vessels 6*a*, 6*b* are shown connected for illustration purposes, it will be appreciated that the apparatus is not limited two connections and may be configured to connect to further storage vessels 6 as required. Each storage vessel is connected to the first needle by a connector 17. An example connector 17 is explained further below with reference to FIG. 7. The connector 17 is configured to clamp the storage vessel 6 to the first needle 2 so that the beverage can be transferred to the storage vessel 6 without leaking and without any ingress of air. The first needle 2 may comprise a plurality of connectors 17 arranged along the length of the needle 2 to allow multiple storage vessels 6 to be connected to the first needle 2 and filled from a single bottle 5. The storage vessels 6*a*, 6*b* of FIGS. 4*a* and 4*b* will be herein referred to as first and second storage vessels 6*a*, 6*b*.

Openings 18 in the first needle 2 allow the beverage to flow between the conduit 4 and the storage vessels 6 connected thereto. The pin 15 acts as a valve to open and close the openings 18. When the pin 15 is positioned over an opening 18, the beverage is blocked from passing out of the opening 18 and into the corresponding storage vessel 6. Therefore, the storage vessels 6 connected to the first needle 2 are filled sequentially by movement of the pin 15 along the conduit 4 as each opening 18 is unblocked in turn.

FIGS. 4*a* and 4*b* show the pin 15 in a first position and second position, respectively. In the first position, a first opening 18*a* is unblocked, allowing the first storage vessel 6*a* to communicate with the conduit 4 and beverage to flow into the first storage vessel 6*a* as the pressurisation mechanism 7 is activated. Once the first storage vessel 6*a* is at capacity, the pin 15 moves along the conduit 4 to the second position, unblocking a second opening 18*b* and allowing the beverage to flow into the second storage vessel 6*b*. Although only two storage vessels 6*a*, 6*b* are depicted in FIGS. 4*a* and 4*b*, it shall be appreciated that any number of vessels 6 may be connected to the first needle 2, as long as there are a corresponding number of connectors 17 and openings 18.

The first storage vessel 6*a* may be a sample vessel 6*a* to allow a sample of the beverage to be extracted and tested before the second storage vessel 6*b* is filled. Advantageously, any air in the bottle 5 is captured by the sample vessel 6*a* to prevent the air being introduced into the second storage vessel (or indeed any further storage vessels that are connected to the first needle 2) that might cause further ageing of the beverage.

It shall be appreciated that the use of a pin 15 inside the first needle 2 prevents air being introduced into the bottle 5 when the first needle 2 is inserted through the stopper 12. This is because the pin 15 occupies the volume inside the conduit 4 that would otherwise be occupied by air. The seal 16 is provided adjacent the tip of the pin 15 so that the beverage is prevented from flowing between the pin 15 and the conduit 4.

Figure 5:
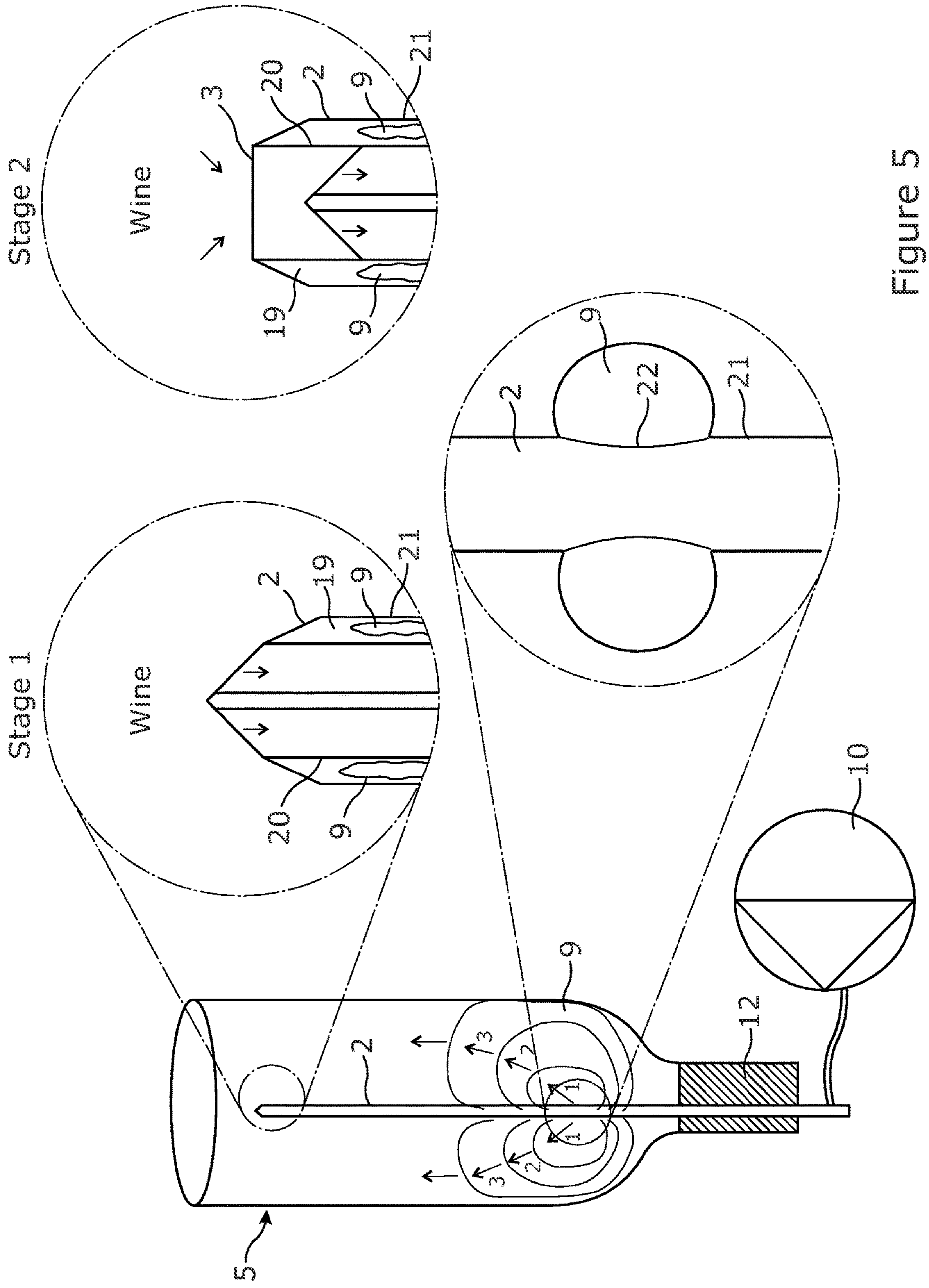
FIG. 5 shows an apparatus for transferring a beverage to a storage vessel according to embodiments of the invention.

FIG. 5 illustrates a second embodiment in which like features retain the same reference numbers. In this embodiment, the second needle 8 is omitted and the bladder 9 is instead provided in the first needle 2. Specifically, the first needle 2 comprises a cavity 19 between a wall 20 of the conduit 4 and an outer wall 21 of the needle 2. The bladder 9 is configured to expand out of an aperture 22 in the outer wall 21 of the needle 2. Advantageously, the second embodiment requires only the first needle 2 to be inserted through the stopper 12 of the bottle 5. In this embodiment, the pump 10 is connected to the first needle 2 to inflate the bladder 9. In use, the first needle 2 is inserted through the stopper 12, the pump 10 is operated and the bladder 9 inflated, displacing the beverage so that the pin 15 moves along the conduit 4 to uncover the openings 8, as described above. Therefore, operation of the second embodiment is substantially as described with reference to the first, minus the requirement to insert a separate second needle 8.

The aperture 22 is configured to allow inflation of the bladder 9 radially about the first needle 2 so that the bladder 9 expands outward and into contact with sides of the bottle 5 on inflation. The aperture 22 may comprise multiple apertures arranged about the circumference and/or along the length of the needle 2. For example, four apertures 22 may be provided spaced 90 degrees apart. Preferably the apertures 22 are spaced from the upper end of the needle 2 so that the bladder 9 expands to displace the beverage toward the upper end and the inlet 3. Preferably, each aperture 22 may be elongate and extend in a longitudinal direction of the needle 2.

Figure 6:
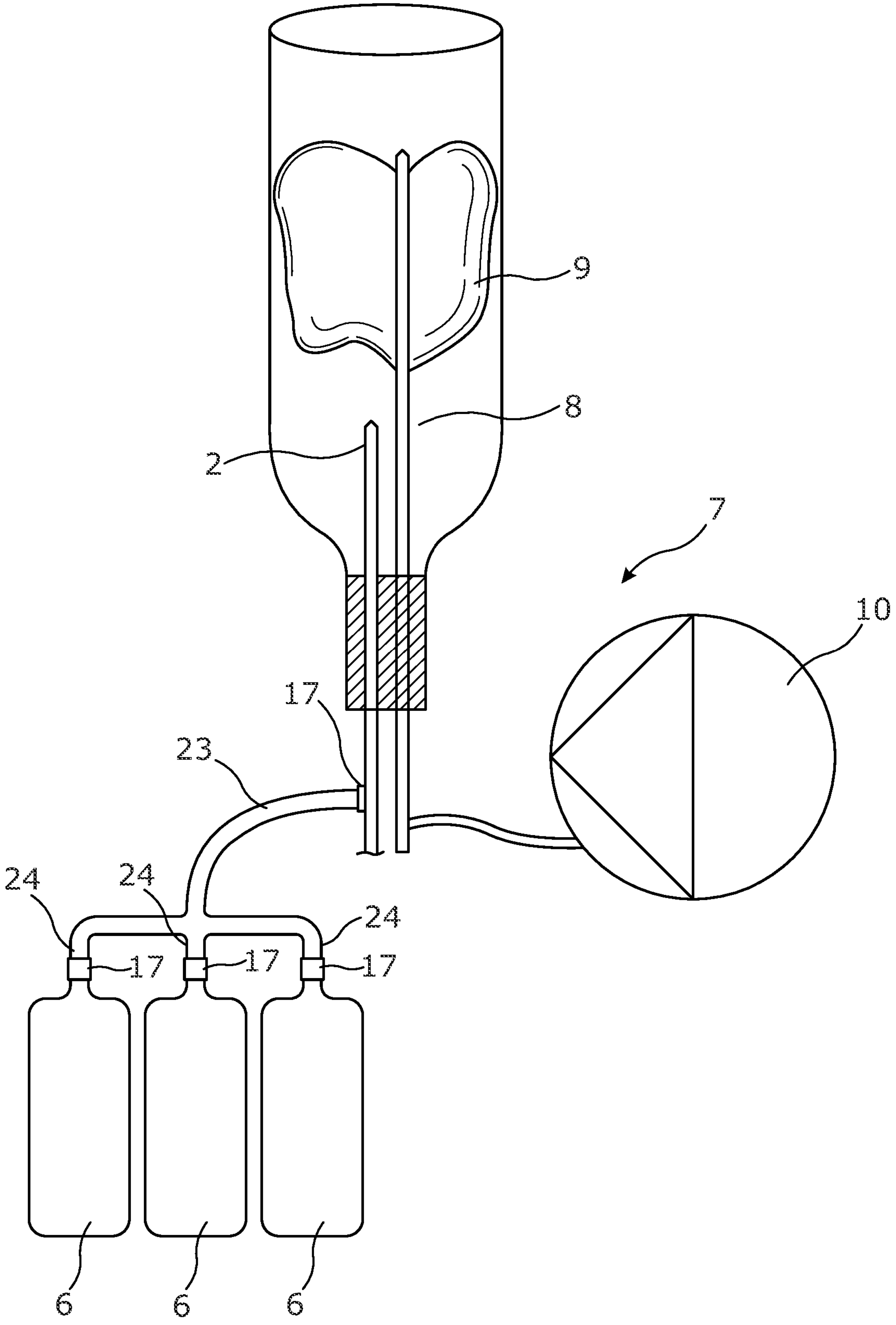
FIG. 6 shows an apparatus for transferring a beverage to a storage vessel according to embodiments of the invention.

In a third embodiment illustrated by FIG. 6, in which like features retain the same reference numbers, the first needle 2 comprises a single opening 18 connecting the conduit 4 to a transfer pipe 23. The transfer pipe 23 branches into individual manifold sections 24 that each terminate with a connector 17 for attachment to a respective storage vessel 6. Therefore, during operation of the fourth embodiment, the beverage flows along the transfer pipe 23 and manifold sections 24 to fill each storage vessel simultaneously. It shall be appreciated that, prior to operation, each of the transfer pipe 23 and manifold sections 24 are vacuum sealed so that no air is introduced into the system when the transfer pipe 23 is attached to the first needle 2. The connector 17 may be configured to break the seal to allow the flow of beverage into the transfer pipe 23 when the transfer pipe 23 is connected to the first needle 2.

Figure 10:
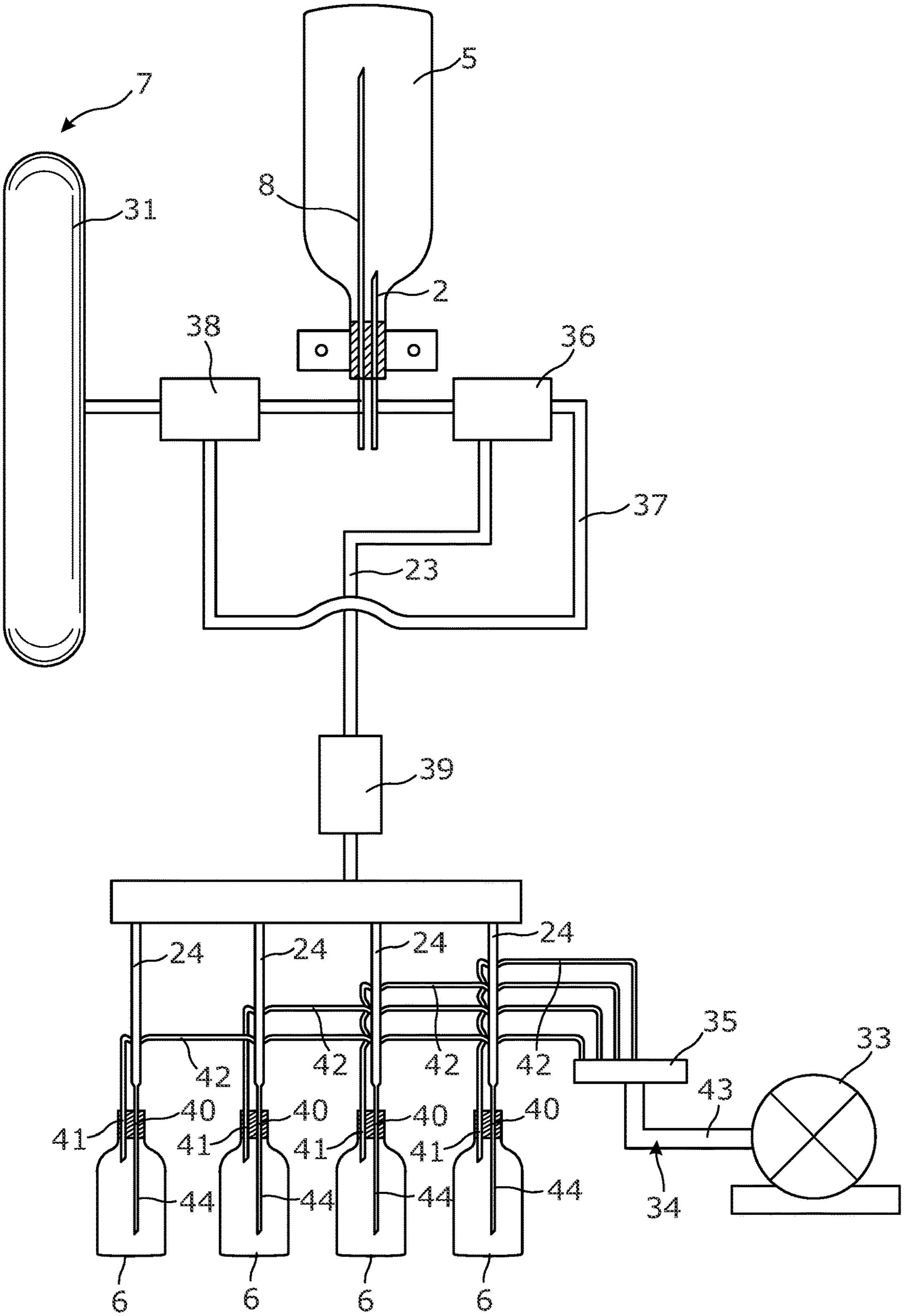
FIG. 10 shows a schematic of apparatus according to the invention.
Figure 11:
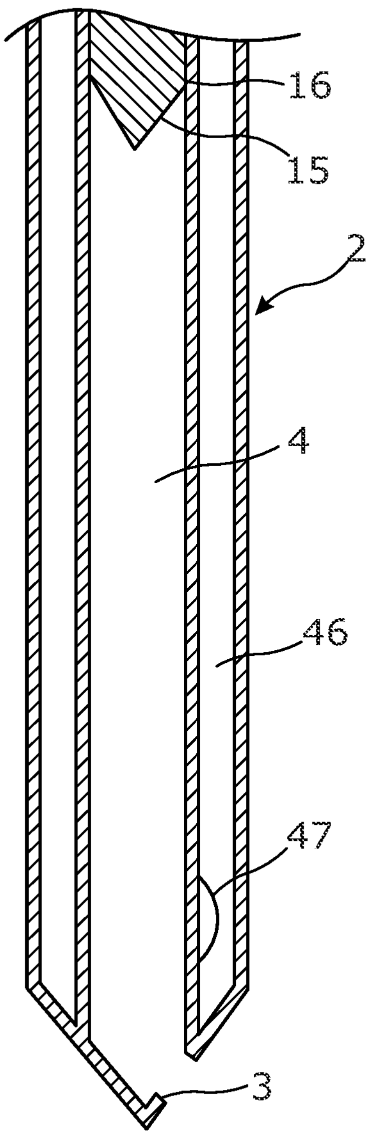
FIG. 11 shows a schematic of a needle according to embodiments of the invention.

In a fourth embodiment, a particular example of which is illustrated by FIG. 10, the pressurisation mechanism 7 is configured to pressurise the sealed bottle 5 using an inert gas. By using an inert gas, the inflatable bladder 9 is not required as the inert gas can come into contact with the beverage without tainting the flavour of the beverage or causing any oxidation. The fourth embodiment may be substantially as described with reference to the first, second or third embodiments, except for the differences set out below. In the fourth embodiment, the pressurisation mechanism 7 comprises a pressurised reservoir of inert gas 31. The inert gas may be introduced into the bottle 5 through the first or second needle 2, 8. In the particular example of FIG. 10, the inert gas is introduced through the second needle 8 which comprises a conduit connected to the reservoir of inert gas and an opening to allow the inert gas to travel along the conduit, out of the opening and into the bottle 5. In an alternative unillustrated example, the second needle 8 is omitted and the inert gas is introduced through the first needle 2, which in this example must comprise a second conduit 46 separate to the first conduit 4. Such a needle 2 is illustrated in FIG. 11. The second conduit 46 is connected to the reservoir of inert gas 31 and has its own opening 47 to allow the inert gas to travel along the second conduit 46, out of the opening 47 and into the bottle 5. The pressurised reservoir may re-fillable and comprise a pressurising pump or it may comprise pre-pressurised replaceable canisters.

To operate the apparatus of the fourth embodiment, the bottle 5 is held by a clamp 32 in an inverted orientation and the first needle 2 is inserted through the stopper 12. Where the first needle 2 comprises the second conduit, gas is introduced into the bottle 5 through the first needle 2 to pressurise the bottle and displace the beverage and pin 15 along the first conduit 4, filling the storage vessels as described above. The second needle 8 may be omitted entirely. Alternatively, and as illustrated by FIG. 10, if the inert gas is to be introduced through the second needle 8, both first and second needles 2, 8 are inserted through the stopper 12. Gas is then introduced into the bottle 5 through the conduit in the second needle to pressurise the bottle and displace the beverage and pin 15 along the conduit 4 in the first needle 2, filling the storage vessels 6 as described above. The second conduit in the first needle 2 is omitted.

In some embodiments, a spring (not shown) may be provided at a bottom end of the conduit 4 to bias the pin 15 toward the inlet 3. The force of the spring may be calibrated so that pressurisation mechanism 7 displaces the pin 15 with the beverage along the conduit 4. It shall be appreciated that when the pin 15 uncovers each opening, the force on the pin 15 drops as the flow of beverage is directed into the corresponding storage vessel 6, preventing further displacement of the pin 15 until the storage vessel 6 is at capacity. In this way, the spring controls the movement of the pin 15 so that an opening 18 is only uncovered when the storage vessel 6 associated with the preceding opening 18 is full.

Figure 9:
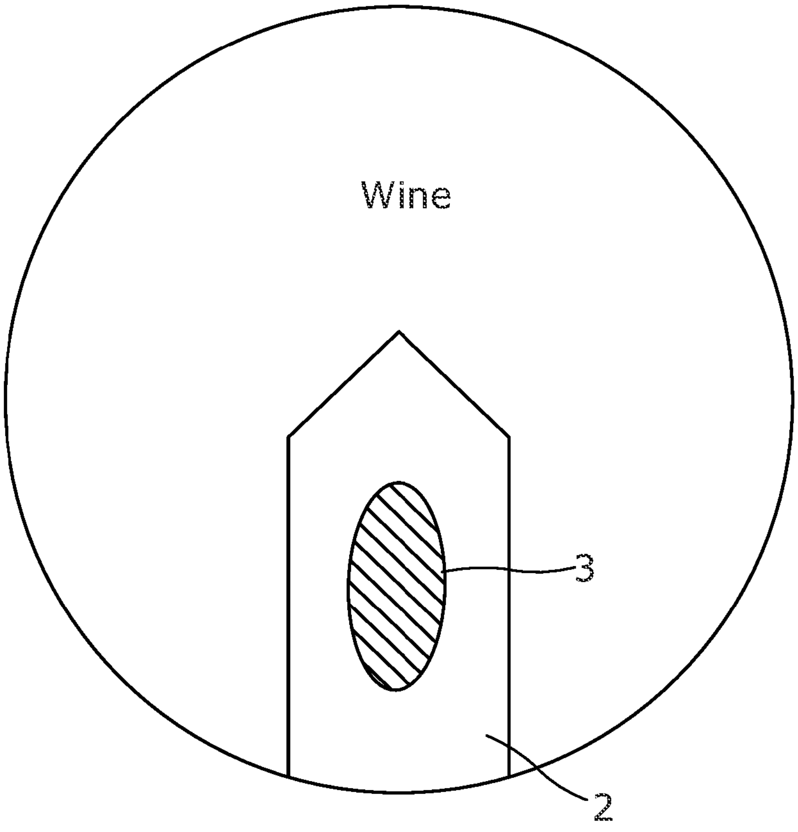
FIG. 9 shows a detail view of a first needle according to embodiments of the invention.

In some embodiments, the inlet 3 is provided in a longitudinal wall of the first needle 2. Therefore, the inlet is not blocked by any material dislodged by insertion through the stopper 12. Such an arrangement is shown in FIG. 9. It will be appreciated that, before operation of the first needle 2, the pin 15 blocks the inlet 3 to prevent air being introduced into the bottle when the first needle 2 is inserted through the stopper 12.

In some embodiments, the apparatus may comprise an actuator (not shown) to control the movement of the pin 15 along the conduit. For example, the actuator may include an electrically driven pinion gear that drives a linear gear on the pin 15 in the manner of a rack and pinion system. A controller may coordinate operation of the pinion gear so that the pin 15 is displaced at a rate corresponding to operation of the displacement mechanism 7. Therefore, the displacement mechanism 7 and pinion gear may act simultaneously so that the bottle 5 is pressurised as the pin 15 is displaced by the pinion gear. The actuator may be configured to hold the pin 15 in a position for a period while a storage vessel 6 is filled. For example, the actuator may be configured to hold the pin 15 in the first position shown in FIG. 4*a* while the first storage vessel 6*a* is filled, and then move to the second position as shown in FIG. 4*b* while the second storage vessel 6*b* is filled.

Figure 7:
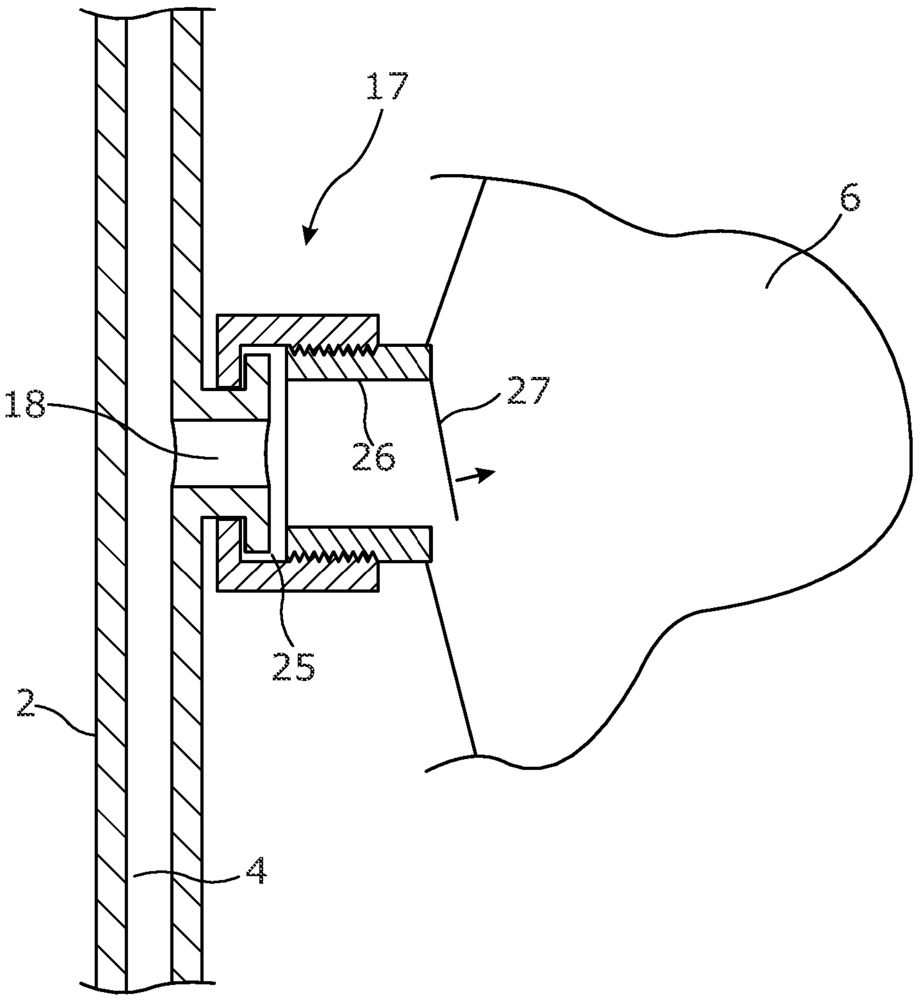
FIG. 7 shows a detail view of a connector according to embodiments of the invention.

In some embodiments, the connector 17 comprises a screw connector as shown in FIG. 7. The screw connector 17 takes the configuration of a union joint and comprises a threaded locknut 25 which is configured to engage a threaded spigot 26 of the storage vessel 6. By tightening the locknut 25 onto the spigot 26, a seal is created. A one-way valve 27 is provided behind the spigot 26 so that, once filled and disconnected, the beverage is sealingly retained in the storage vessel 6. A screw cap (not shown) may be provided for screwing on to the spigot 26 after the storage vessel 6 has been filled and removed from the connector 17.

Although the connector 17 illustrated by FIG. 7 is a screw connector, it will be appreciated that, although not exemplified in detail here, other connectors 17 may be used such as interference fit connectors, bayonet connectors and the like.

In each of the above-described embodiments, when the first needle 2 is inserted through the stopper 12 and connected to a storage vessel, the apparatus provides a closed system that prevents the beverage from mixing with air outside of the bottle 5.

In some embodiments a vacuum pump may be fluidly connected to the conduit 4 to remove any residual air in the connectors 17, storage vessels 6 and transfer pipe 23 (where present). The pump may be operated once a closed system has been made in the manner described. Therefore, during the transfer process, the beverage is prevented from coming into contact with any air outside of the bottle 5.

The particular example of FIG. 10 introduces further detail, which is explained below.

A vacuum pump 33 is connected to four storage vessels 6. Each storage vessel 6 is a quarter bottle comprising a stopper 40. A pin 41 is inserted through each stopper 40 to allow air to be drawn out of the storage vessel 6 through the pin 41 by the vacuum pump 33. To achieve this, each pin 41 is fluidly connected to the vacuum pump 33 by a vacuum line 34. The vacuum line 34 comprises sub lines 42 connected to each pin 41 and a manifold 35, which connects the sub lines 42 to a main line 43. The main line 43 in turn connects the manifold 35 to the vacuum pump 33.

As in the third embodiment, the example of FIG. 10 further comprises a transfer pipe 23 and manifold sections 24. However, in the example of FIG. 10, each manifold section 24 terminates in a filling pin 44 which is inserted through the stoppers 40 of the storage vessels 6. Also provided in this example are two three-way control valves 36, 38 and a bypass pipe 37, which are assembled as follows. The first three-way control valve 36 connects the transfer pipe 23 to the first needle 2 and to a first end of the bypass pipe 37. The second three-way control valve 38 connects the reservoir of inert gas 31 to the bypass pipe 37 and the second needle 8. A filter 39 is provided on the transfer pipe 23 to remove sediment from the beverage.

In the example of FIG. 10, to transfer the beverage from the bottle 5 to the storage vessels 6, the following steps are followed:

- The first three-way control valve 36 is set in a first position to connect the transfer pipe 23 to the bypass pipe 37, closing off the first needle 2.
- The second three-way control valve 38 is set to first position to connect the reservoir 31 to the bypass pipe 37, closing off the second needle 8.
- The vacuum pump 33 is activated to draw air out of the storage vessels 6, manifold sections 24, transfer pipe 23 and bypass pipe 37. This causes inert gas to be drawn from the reservoir 31 and into the bypass pipe 37, transfer pipe 23, manifold sections 24 and storage vessels 6, thereby flushing inert gas through each of the bypass pipe 37, transfer pipe 23, manifold sections 24 and storage vessels 6.
- The vacuum pump 33 is deactivated; the first three-way control valve 36 is set in a second position to connect the transfer pipe 23 to the first needle 2, closing off the bypass pipe 37; and the second three-way control valve 38 is set in a second position to connect the reservoir 31 to the second needle 8, closing off the bypass pipe 37. This causes inert gas to pressurize the bottle 5, displacing the beverage from the bottle 5, along the transfer pipe 23 and manifold sections 24 and into the storage vessels 6.

Once the storage vessels 6 are full, the second three-way control valve 38 is set to a third position to isolate the reservoir 31 from the second needle 8 and the bypass pipe 37. The pins 41, 44 are removed from the stoppers 40 of the storage vessels 6 to allow the storage vessels 6 to be separated from the system.

It shall be appreciated that the stoppers 40 are self-sealing so that, on removal of the pins 41, 44, the storage vessels 6 are completely air tight.

The system may be reused by attaching new empty storage vessels 6 and repeating the steps above.

While the example of FIG. 10 provides a system to decant the beverage into four quarter bottles, it will be appreciated that the system can be simply modified to decant the beverage into any number of storage vessels 6, depending on the desired volume of the storage vessels 6.

Furthermore, while the example of FIG. 10 illustrates there being first and second needles 2, 8. It will be appreciated that a single needle 2 may be used, as described above in connection with FIG. 11. In such an example, the first three-way control valve 36 connects the transfer pipe 23 to the first conduit 2 and to a first end of the bypass pipe 37. The second three-way control valve 38 connects the reservoir of inert gas 31 to the bypass pipe 37 and the second conduit of the needle 2.

Figure 12:
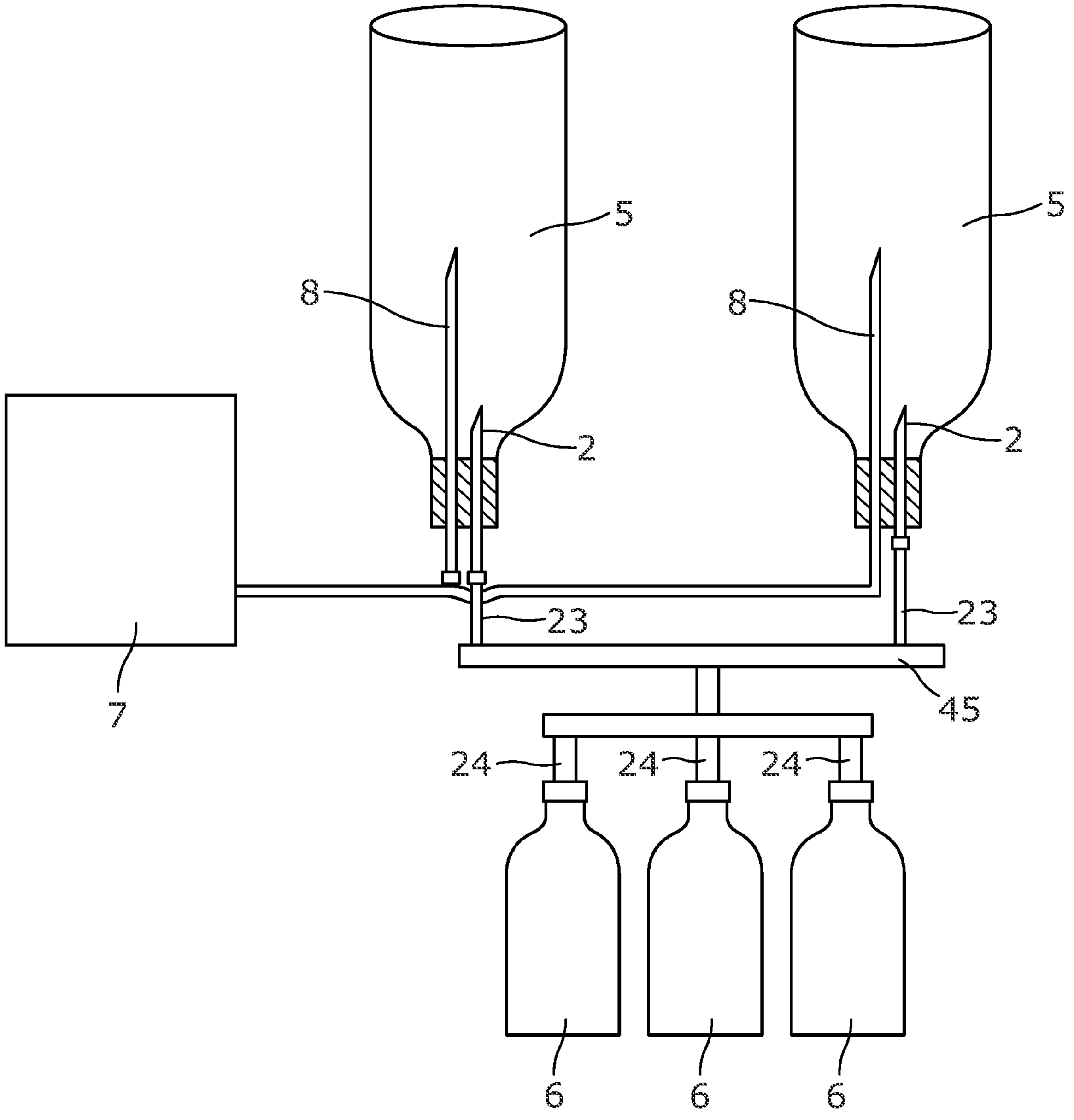
FIG. 12 shows a schematic of apparatus according to the invention.

Furthermore, while the above embodiments describe and illustrate transferring a beverage from a single sealed container 5, it will be appreciated that minor modification of the apparatus will allow the simultaneous transfer of beverage from a plurality of sealed containers 5. This may mean the transfer from a plurality of sealed containers 5 into a single storage vessel 6 (as illustrated in FIG. 12), or the transfer from a plurality of sealed containers 5 into a plurality of storage vessels 6. To transfer beverage from a plurality of sealed containers 5, a needle 2 (and optionally a second needle 8) is provided for each sealed container and operated substantially as described above. In such embodiments, each needle 2 is provided with its own transfer pipe 23 leading to a transfer pipe manifold 45, so that the beverages are pre-mixed, before passing through manifold sections 24 and into the storage vessels 6. FIG. 12 schematically shows the pressurisation mechanism 7 which may be a pump 10 for inflating a bladder or may be source of inert gas 31, as described above. Although not illustrated, a vacuum pump 33 may be provided as described above. The sealed containers 5 may contain the same beverage or may contain different beverages so that, for example, the storage vessels 6 are filled with a pre-mixed cocktail.

By providing a closed system, the beverage is transferred to the storage vessel 6 without introducing fresh air into the bottle that could cause further ageing or oxidation. The beverage may therefore be stored having the exact same flavour characteristics developed in the bottle. This allows the beverage to be stored when it has aged to an optimum flavour condition without the beverage to surpassing the optimum condition by over-ageing. Furthermore, the beverage may be stored in multiple storage vessels 6 to allow individual portions to be consumed at different times, while each portion provides the exact same quality and taste experience. This is to be compared with opening a bottle and consuming the beverage from the bottle over a period of time, in which time the beverage will have degraded.

In some embodiments, the storage vessel 6 comprises a flexible bag that is vacuum sealed prior to connection to the apparatus 1. By vacuum sealed, it is meant that air is pumped out of the bag so that atmospheric pressure compresses each side of the bag together. A screw cap may be attached to the spigot 26 (where one is provided) to prevent any ingress of air prior to use. In some embodiments, the spigot is attached to a neck portion of the bag that is configured to be heat sealed. In particular, the neck portion may be placed between two heated plates following detachment from the connector 17 to cause the neck portion to fuse. The bag may be made from a polymer material. The storage vessel 6 may further comprise a cardboard outer box (not shown) to house the flexible bag for ease of storage.

In some embodiments, the apparatus further comprises a filter (not shown) to prevent any sediment that is present within the container 5 from passing into the storage vessels 6. The filter may be provided in any part of the system between the inlet 3 and the storage vessels 6. For example, the filter may be provided over the inlet 3 or across any of the openings 18 of the first needle 2.

The storage vessel 6 may be any capacity required. For example, the storage vessel 6 may equal the capacity of the bottle 5, or the storage vessel may be smaller, for example, where the storage vessel 6 is configured as a sample vessel.

Figure 8:
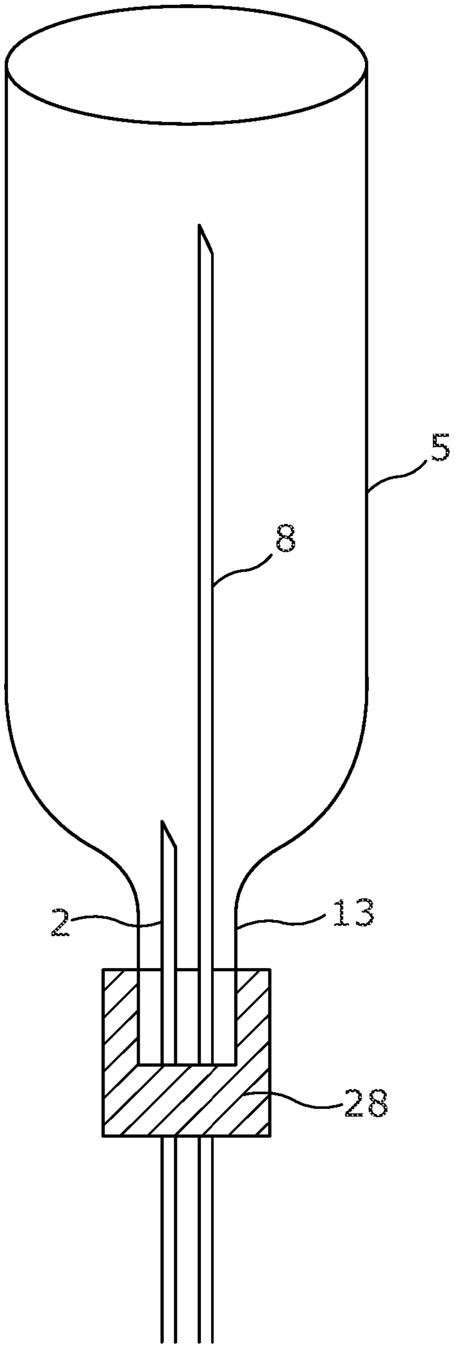
FIG. 8 shows an additional stopper according to embodiments of the invention.

In the embodiments described herein, the term 'stopper 12' is used to describe any plug that seals the container/bottle 5 and that is capable of forming a seal around the first and second needles 2, 8 when they are inserted through the stopper 12. By 'seals the container', it is meant that the stopper 12 prevents the beverage from leaking out of the container 5 and does not preclude the stopper 12 being permeable to air. Indeed, generally the invention is intended for use with permeable stoppers 12 that allow the slow ingress of air for ageing. Typically, the stopper 12 will be a cork or a synthetic cork, as commonly used with wine bottles or spirit bottles. However, to allow the invention to be used with screw cap bottles that do not comprise a stopper 12 that will provide a suitable seal around the needles 2, 8, an additional stopper 28 may be provided as part of the apparatus, as shown in FIG. 8. The additional stopper 28 is cup shaped and configured to provide an interference fit over the neck 13 of the bottle 5 and cover screw cap or the like. Therefore, additional stoppers 28 may be provided in a variety of sizes and shapes to suit typical bottle sizes. The additional stopper is made from self-sealing material, such as synthetic cork, to allow the needles 2, 8 to be inserted without leakage.

In the embodiments described herein, the term 'beverage' is meant to encompass any liquid that may be transferred from a sealed container to a storage vessel in the manner described. The apparatus finds particular application in the transfer of wine for all the reasons given, but other examples might include spirits such as whiskey and the like.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. An apparatus for transferring a beverage from a sealed container into a storage vessel, the apparatus comprising:

a first needle for insertion through a stopper of the sealed container, the first needle having a conduit for the beverage to flow through the first needle;

a transfer pipe to fluidly connect the first needle to the storage vessel so that, when assembled, the sealed container, first needle, transfer pipe and storage vessel form part of a closed system allowing the beverage to be transferred from the sealed container into the storage vessel without air outside of the closed system mixing with the beverage;

a pressurisation mechanism configured to pressurize the sealed container to displace the beverage through the first needle and into the storage vessel, the pressurisation mechanism comprising a reservoir containing inert gas and a second needle for insertion through the stopper of the sealed container to introduce inert gas and purge the sealed container of residual air inside;

a bypass pipe to fluidly connect the transfer pipe to the reservoir; and first and second three-way control valves, the first three-way control valve is connecting the first needle to the transfer pipe and the bypass pipe, and the second three-way control valve is connecting the second needle to the reservoir containing inert gas and the bypass pipe;

wherein the first and second three-way control valves are configurable in a first position to connect the reservoir containing inert gas to the transfer pipe via the bypass pipe to flush through the closed system with the inert gas; and wherein the first and second three-way control valves are configurable in a second position to connect the second needle to the reservoir of inert gas and to connect the transfer pipe to the first needle to allow pressurisation of the sealed container and the displacement of beverage along the transfer pipe.

2. The apparatus according to claim 1, further comprising a vacuum pump fluidly connected to the storage vessel so that, when the first and second control valves are in the first position, operation of the vacuum pump draws the inert gas into the storage vessel.

3. The apparatus according to claim 1 wherein the storage vessel comprises a bottle or a flexible bag and a self-sealing stopper.

4. The apparatus according to claim 3 further comprising:

a vacuum pump and a pin for removal of air from the flexible bag, the pin being fluidly connected to the vacuum pump and insertable through the self-sealing stopper.

5. The apparatus according to claim 3, wherein the first needle is provided in fluid communication with a filling pin disposed at the transfer pipe and configured for insertion through the self-sealing stopper.

6. The apparatus according to claim 1, wherein the inert gas flushes through the transfer pipe before beverage transfer begins.

7. The apparatus according to claim 6, wherein the inert gas flushes through the storage vessel before beverage transfer begins.

8. The apparatus according to claim 1, wherein the inert gas flushes through the storage vessel before beverage transfer begins.

9. The apparatus according to claim 6, wherein the inert gas flushes through the bypass pipe before beverage transfer begins.

10. An apparatus comprising:

a first needle for insertion through a stopper of a sealed container that contains a beverage, the first needle having a conduit for the beverage to flow through the first needle;

a storage vessel;

a transfer pipe fluidly connecting the first needle to the storage vessel;

a pressurisation mechanism comprising a reservoir containing inert gas;

a second needle for insertion through the stopper of the sealed container;

a bypass pipe fluidly connecting the transfer pipe to the reservoir;

a first control valve connecting the transfer pipe to either the first needle or the bypass pipe; and a second control valve connecting the reservoir to either the second needle or the bypass pipe;

wherein the first control valve and second control valve are configurable in a first configuration and a second configuration, wherein the first configuration connects the reservoir containing inert gas to the transfer pipe via the bypass pipe, such that the transfer pipe can be flushed with the inert gas; and the second configuration connects the reservoir containing inert gas to the first needle to allow pressurisation of the sealed container and the displacement of beverage along the transfer pipe.

11. The apparatus according to claim 10, wherein the storage vessel includes a self-sealing stopper.

12. The apparatus according to claim 11, wherein the first needle is provided in fluid communication with a filling pin disposed at the transfer pipe and configured for insertion through the self-sealing stopper.

13. The apparatus according to claim 10, wherein the reservoir containing inert gas comprises a replaceable pressurized canister.

14. The apparatus according to claim 10 further comprising a clamp configured to hold the sealed container in an inverted orientation.

15. The apparatus according to claim 10, wherein the inert gas flushes through the transfer pipe before beverage transfer begins.

16. The apparatus according to claim 15, wherein the inert gas flushes through the storage container before beverage transfer begins.

17. The apparatus according to claim 10, wherein the inert gas flushes through the storage vessel before beverage transfer begins.

18. The apparatus according to claim 10, wherein the inert gas flushes through the bypass pipe before vessel transfer begins.

* * * * *